United States Patent [19]

Willis et al.

[11] 4,340,968
[45] Jul. 20, 1982

[54] RARE-GAS HYDROGEN-HALIDE EXCIMER LASER WITH HYDROGEN ADDITIVE

[75] Inventors: Clive Willis, Ottawa; Terrence J. McKee, Nepean, both of Canada

[73] Assignee: Canadian Patents & Dev. Ltd., Ottawa, Canada

[21] Appl. No.: 157,942

[22] Filed: Jun. 9, 1980

[51] Int. Cl.$^3$ .............................................. H01S 3/22
[52] U.S. Cl. ........................................ 372/60; 372/57
[58] Field of Search .............................. 331/94.56 DE

[56] References Cited
PUBLICATIONS

"Sealed TEA CO₂ Lasers with External Control of Gas Chemistry" by Willis et al; *Appl. Physics Lett.*, vol. 31, No. 2, Jul. 15 1977; pp. 84–86.
"Catalytic Control of the Gas Chemistry of Sealed TEA CO₂ Lasers" by Willis et al; *J. Appl. Physics* 50 (4), Apr. 1979; pp. 2539–2543.
"Gas Consumption Characteristics of a Recirculating HF-Laser" by Willis et al.; *Rev. Sci. Instrum.*, 50 (5) May 1979; pp. 622–624.
"A Closed-Cycle Gas Recirculating System for Rare-Gas Halide Excimer Lasers" by Johnson et al.; *Appl. Phys. Lett.* 32 (5), Mar. 1 1978; pp. 291–292.

*Primary Examiner*—William L. Sikes
*Assistant Examiner*—Leon Scott, Jr.
*Attorney, Agent, or Firm*—Edward Rymek

[57] ABSTRACT

A rare-gas hydrogen-halide laser is improved by including or adding a predetermined quantity of a hydrogen donor additive to its gas mixture. The closed-off operation lifetime of lasers such as XeCl, KrCl, or XeBr are tripled by adding up to 0.05% hydrogen to the laser gas mixture.

20 Claims, 4 Drawing Figures

RARE-GAS HYDROGEN-HALIDE EXCIMER LASER WITH HYDROGEN ADDITIVE

BACKGROUND OF THE INVENTION

This invention is directed to rare-gas hydrogen-halide excimer lasers, and in particular to the gas mixtures for these excimer lasers.

The long term, stable operation of rare-gas halide excimer lasers is a necessary prerequisite to their use as reliable tools in industrial applications. The discharge parameters and circuit characteristics of electric discharge excimer lasers have been examined, however, it has been determined that the effects of gas chemistry in these lasers is also important.

The combination of gas recycling and gas additives in pulsed infrared lasers such as $CO_2$ and HF have been reported by C. Willis, and J. F. Purdon in the J. Appl. Phys. 50, 2539 (1979), and by C. Willis, M. Dosi and D. J. James in the Rev. Sci. Instr. 50, 622 (1979), respectively. These have led to significant reductions in operation costs. Similar efforts with rare-gas halide lasers have been described by M. A. Ackerman and R. A. Tennant in the Proceedings of the Topical Conference on Excimer Lasers, Charleston, S.C. (1979); by P. M. Johnson, N. Keller and R. E. Turner, Applied Physics Letters 32, 291 (1978), and by C. P. Christensen, Applied Physics Letters 30, 483 (1977). These typically employ gas recycling in an external loop where the halogen donor and reactive impurities are removed with a sequence of getter traps; subsequent introduction of the pure halogen donor leads to a revitalized gas mixture.

SUMMARY OF THE INVENTION

It is an object of this invention to extend the closed-off operating lifetime of rare-gas halide excimer lasers which have halogen donors consisting of hydrogen halides.

This and other objects are achieved by providing a gas mixture which includes two rare gases, a hydrogen halide and a hydrogen donor additive. The quantity of hydrogen donor may be in the order of up to 0.05% of the gas mixture or less than half the quantity of the hydrogen halide.

In accordance with another aspect of this invention, the operating lifetime of the gas mixture of a rare-gas hydrogen-halide excimer laser may be extended by adding a predetermined quantity of a hydrogen donor additive to the laser gas mixture.

In accordance with yet another aspect of this invention, a rare-gas hydrogen-halide excimer laser may be provided which includes a laser cavity defined by optically reflective elements, a gas mixture including two rare gases, a hydrogen halide and a hydrogen donor additive in the cavity, a gas preionizer and discharge electrodes positioned about the laser cavity which excite the gas mixture.

The components of the gas mixture may be hydrogen for the hydrogen donor additive, HCl for the hydrogen halide, He for one of the rare gases and Xe or Kr for the other rare gas. These would be in a ratio which provides effective lasing action.

Many other objects and aspects of the invention will be clear from the detailed description of the drawings.

DETAILED DESCRIPTION

Figure 1:
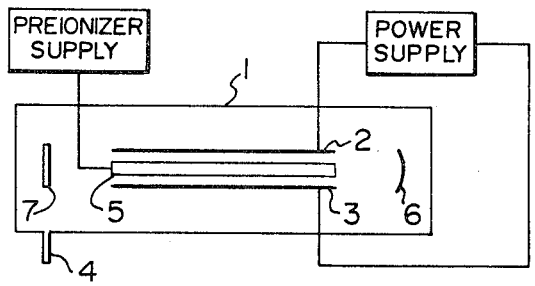
FIG. 1 schematically illustrates the structure of a conventional ultraviolet preionized excimer laser.

One laser system which can utilize the present invention is shown schematically in FIG. 1. It is a Lumonics TE-861 multi-gas laser which has a gas chamber 1 having a pair of electrodes 2, 3. A gas mixture is sealed 4 in the chamber 1 and made to flow transversely between the electrodes 2, 3 by a circulating system. This gas is subjected to ultraviolet preionization by a preionizer 5. The optics consists of an aluminized rear surface reflector 6 and a suprasil fused silica etalon output coupler 7. Though a specific type of laser structure is described to exemplify the invention, the invention can be utilized with other forms of lasers.

The above laser system may have one of a number of conventional rare-gas hydrogen-halide gas mixtures introduced into the chamber 1. When properly energized, these conventional mixtures will provide a number of laser pulses from a single gas fill and will continue to do so until the contaminants build up. In accordance with the present invention, the lifetime of the gas mixtures for such lasers can be extended by introducing a very low concentration of a hydrogen donor additive to the gas mixture. The introduction of the hydrogen donor additive maintains favourable gas mixture properties through chemical equilibrium. The hydrogen donor additive will preferably be hydrogen itself, however, compounds such as alcohols are alkanes which have easily abstractable hydrogen atoms may also be used. The concentration of the hydrogen or hydrogen donor additive will be up to 0.05% of the mixture which represents a quantity which is less than half the hydrogen halide concentration. The invention is effective with rare-gas hydrogen-halide excimer lasers such as the XeCl, KrCl and XeBr lasers.

In an example of a XeCl excimer laser system in accordance with this invention, the gas chamber 1 was filled with a gas mixture Xe/HCl/He in the ratio 22 torr/1.8 torr/2200 torr. The discharge cross-section of the laser was approximately 7 mm×20 mm. The main supply provided 800 watts of power and the laser system was operated at a repetition rate of 150 Hz. The laser output power, as shown in FIG. 2, starts at 8 watts, rapidly decreases, levels off to a plateau and then more gradually falls off to half power near 1 million pulses.

Figure 2:
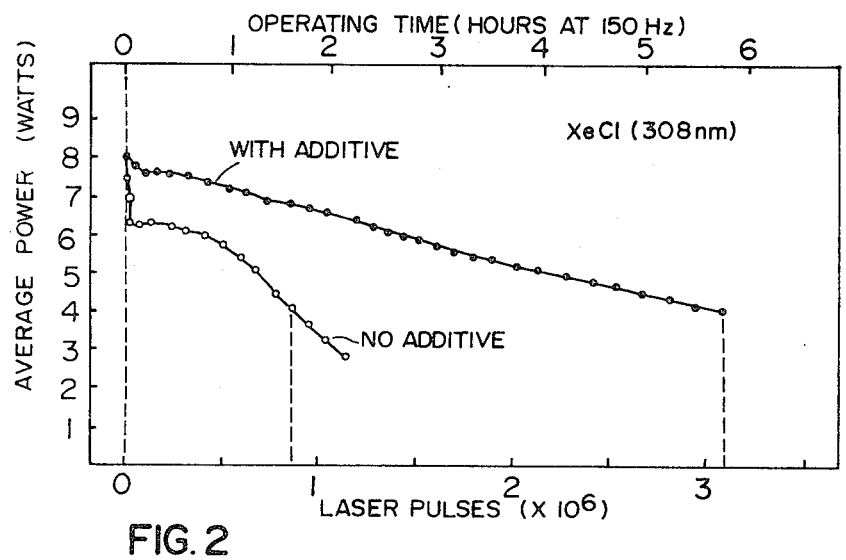
FIG. 2 shows the average power output as a function of the number of laser pulses for an XeCl laser having a gas mixture without and with hydrogen.

However, with approximately 1 torr of hydrogen added to a fresh gas mixture in accordance with the present invention, a significant improvement in laser stability and operating lifetime is observed as shown in FIG. 2. The laser output starts at 8 watts once again, and then more or less gradually falls off to half power at over 3 million pulses. In addition, approximately 25% of the decrease in output power after 3 million pulses can be attributed to the coating of the laser optics rather than to gas deterioration.

Figure 3:
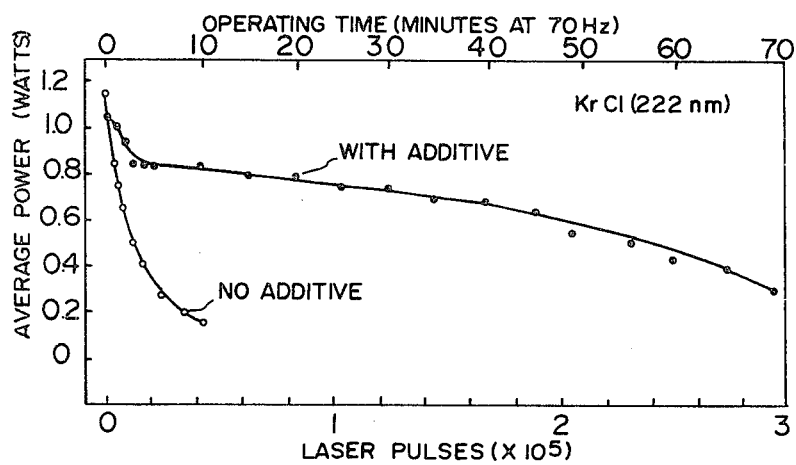
FIG. 3 shows the average power output as a function of the number of laser pulses for a KrCL laser having a gas mixture without and with hydrogen.

In an example of a KrCl excimer laser system in accordance with this invention, the gas chamber 1 was filled with a gas mixture Kr/HCl/He in the ratio of 110 torr/1.8 torr/2150 torr. Once again the discharge cross-section of the laser was approximately 7 mm × 20 mm and the main power supply provided 800 watts of power. The laser system was operated at a repetition rate of 70 Hz. As shown in FIG. 3, the laser output power starts at approximately 1.15 watts and decays rapidly to half power after 10,000 pulses.

With approximately 0.4 torr hydrogen added to a fresh gas mixture, in accordance with this invention, the initial output power was reduced somewhat to a little over 1 watt, however the output power then fell off gradually to half power after more than 200,000 pulses.

Figure 4:
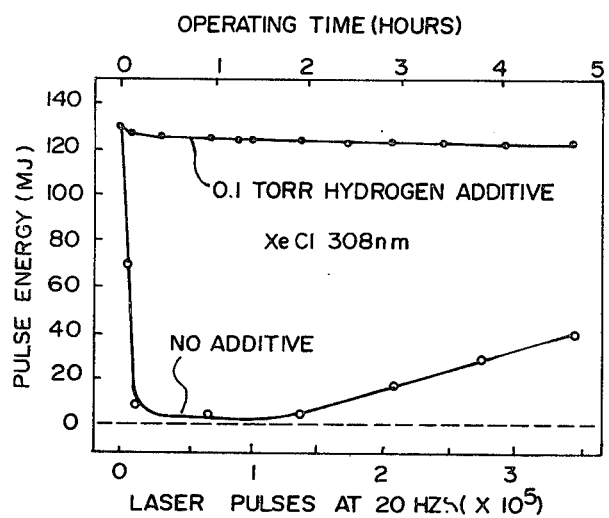
FIG. 4 shows the pulse energy output as a function of the number of laser pulses for a XeCl laser having a gas mixture without and with hydrogen.

In a second example of a XeCl excimer laser, a system having a discharge cross-section of 20 mm × 20 mm was operated at a repetition rate of 20 Hz to observe the effects of increased discharge volume and lower optical gain. The gas mixture was the same as in the first XeCl laser example, i.e. Xe/HCl/He: 22 torr/1.8 torr/2200 torr. As shown in FIG. 4, the output pulse energy of the laser dropped to near zero mJ almost immediately and then started to improve slowly after approximately 13,000 pulses. The same system, however, with the addition of 1 torr hydrogen to the gas mixture, in accordance with the present invention, operated stably at 125 mJ per pulse over a long period of time, 5 hours being shown in FIG. 4.

Many modifications in the above described embodiments of the invention can be carried out without departing from the scope thereof, and, therefore, the scope of the present invention is intended to be limited only by the appended claims.

We claim:

1. In a rare-gas hydrogen-halide excimer laser the gas mixture including: two rare gases, a hydrogen halide, and a hydrogen donor additive.

2. A gas mixture as claimed in claim 1 wherein the quantity of hydrogen donor additive is in the order of up to 0.05%.

3. A gas mixture as claimed in claim 1 or 2 wherein the hydrgen halide is HCl.

4. A gas mixture as claimed in claim 1 or 2 wherein the hydrogen halide is HCl and the hydrogen donor additive is hydrogen.

5. A gas mixture as claimed in claim 1 or 2 wherein one rare gas is helium, the other rare gas is Xe or Kr and the hydrogen halide is HCl.

6. A gas mixture as claimed in claim 1 or 2 wherein one rare gas is He, the other rare gas is Xe or Kr and the hydrogen halide is HCl, and the hydrogen donor additive is hydrogen.

7. A gas mixture as claimed in claim 1 or 2 wherein the hydrogen donor additive is hydrogen.

8. A gas mixture as claimed in claim 1 wherein the gas mixture is Xe/HCl/He/$H_2$ in a ratio in the order of 22 torr/1.8 torr/2200 torr/1 torr.

9. A gas mixture as claimed in claim 1 wherein the gas mixture is Kr/HCl/He/$H_2$ in a ratio in the order of 110 torr/1.8 torr/2150 torr/0.4 torr.

10. A method of extending the operating lifetime of the gas mixture is a rare-gas hydrogen-halide excimer laser comprising: adding a hydrogen donor additive to the excimer laser gas mixture.

11. A method of extending the operating lifetime of the gas mixture in an excimer laser having a gas mixture of Xe/HCl/He comprising: adding a hydrogen donor additive to the gas mixture.

12. A method of extending the operating lifetime of the gas mixture in an excimer laser having a gas mixture of Kr/HCl/He comprising adding hydrogen donor additive to the gas mixture.

13. A method as claimed in claims 10, 11 or 12 wherein the hydrogen donor additive is hydrogen.

14. A method as claimed in claims 10, 11 or 12 wherein the hydrogen donor additive is hydrogen in a quantity in the order of 0.05%.

15. A rare-gas hydrogen-halide excimer laser the improvement comprising:
a gas mixture including two rare gases, a hydrogen halide, and a hydrogen donor additive in a resonant cavity;
means for preionizing the gas mixture; and
discharge electrode means for exciting the gas mixture.

16. A rare-gas hydrogen-halide excimer laser as claimed in claim 15 wherein the hydrogen donor additive is hydrogen.

17. A rare-gas hydrogen-halide excimer laser as claimed in claim 16 wherein the hydrogen halide is HCl.

18. A rare-gas hydrogen-halide excimer laser as claimed in claim 17 wherein one of the rare gases is He and the other rare gas is selected from the group consisting of Xe or Kr.

19. A rare-gas hydrogen-halide excimer laser as claimed in claims 16, 17 or 18 wherein the quantity of hydrogen is in the order of up to 0.05% of the gas mixture.

20. A rare-gas hydrogen-halide excimer laser as claimed in claims 17 or 18 wherein the quantity of hydrogen is less than half the quantity of the hydrogen halide.

* * * * *